US007383255B2

(12) United States Patent
Desai et al.

(10) Patent No.: US 7,383,255 B2
(45) Date of Patent: Jun. 3, 2008

(54) COMMON QUERY RUNTIME SYSTEM AND APPLICATION PROGRAMMING INTERFACE

(75) Inventors: Arpan A. Desai, Kirkland, WA (US); Mark W. Fussell, Sammamish, WA (US); Andrew E. Kimball, Sammamish, WA (US); Michael L. Brundage, Kirkland, WA (US); Sergey Dubinets, Bellevue, WA (US); Todd F. Pfleiger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 10/601,445

(22) Filed: Jun. 23, 2003

(65) Prior Publication Data

US 2004/0260691 A1  Dec. 23, 2004

(51) Int. Cl.
*G06F 17/30* (2006.01)
(52) U.S. Cl. .................. 707/4; 707/1; 707/3; 707/102; 707/104.1
(58) Field of Classification Search .............. 707/2, 707/3, 4, 10, 100, 102, 1, 200, 104.1
See application file for complete search history.

(56) References Cited

U.S. PATENT DOCUMENTS

| | | | |
|---|---|---|---|
| 6,766,330 B1 * | 7/2004 | Chen et al. ................. 707/102 |
| 6,772,148 B2 * | 8/2004 | Baclawski .................... 707/3 |
| 6,785,673 B1 * | 8/2004 | Fernandez et al. .............. 707/3 |
| 6,882,995 B2 * | 4/2005 | Nasr et al. .................... 707/3 |
| 6,901,403 B1 * | 5/2005 | Bata et al. ................. 707/101 |
| 6,901,410 B2 * | 5/2005 | Marron et al. ........... 707/104.1 |
| 6,934,712 B2 * | 8/2005 | Kiernan et al. ............. 707/102 |
| 6,950,815 B2 * | 9/2005 | Tijare et al. .................... 707/1 |
| 6,954,748 B2 * | 10/2005 | Dettinger et al. .............. 707/2 |

(Continued)

FOREIGN PATENT DOCUMENTS

WO  WO 02/35395 A2  5/2002

OTHER PUBLICATIONS

Huang, H.C. et al., "A Query Mediation Approach to Interoperability of Heterogeneous Databases", *Institute of Electrical and Electronics Engineers, Inc.*, 1998, Australasian Database Conference, Jan. 31-Feb. 3, 2000, 41.

Gardarin, G. et al., "Integrating Heterogeneous Data Sources with XML and XQuery", *Proceedings of the 13th International Workshop on Database and Expert Systems Applications(DEXA)*, 2002, 713-718, XP010612111.

(Continued)

*Primary Examiner*—Tim Vo
*Assistant Examiner*—Dangelino N Gortayo
(74) *Attorney, Agent, or Firm*—Woodcock Washburn LLP

(57) ABSTRACT

A query runtime architecture and an exemplary application programming interface suitable for the architecture are presented. The architecture inputs one or more XML queries and views and enables the queries to be translated wherein the queries and views may be run over multiple data sources of different data models. The architecture incorporates front-end compilers which convert input queries and views into an intermediate language representation which represents the meaning of the respective query or view. The architecture may then allow the back-end compiling of the intermediate language representation to target languages compatible with the data sources desired to be queried. The architecture also allows the execution of those target compilations to extract the data requested of the queries. The invention also discloses an example application programming interface for the query runtime system.

14 Claims, 3 Drawing Sheets

U.S. PATENT DOCUMENTS

| | | | | |
|---|---|---|---|---|
| 6,957,214 | B2* | 10/2005 | Silberberg et al. | 707/4 |
| 6,961,728 | B2* | 11/2005 | Wynblatt et al. | 707/10 |
| 7,039,622 | B2* | 5/2006 | Chu | 706/46 |
| 7,120,645 | B2* | 10/2006 | Manikutty et al. | 707/102 |
| 2001/0037345 | A1 | 11/2001 | Keirnan et al. | 707/513 |
| 2005/0120027 | A1* | 6/2005 | Ter Horst | 707/100 |

OTHER PUBLICATIONS

Shanmugasundaram, J. et al., "Querying XML Views of Relational Data", *Proceedings of the 27th International Conference on Very Large Data Bases*, 2001, 10 pages.

* cited by examiner

COMMON QUERY RUNTIME SYSTEM AND APPLICATION PROGRAMMING INTERFACE

FIELD OF THE INVENTION

The invention relates generally to the field of software querying over data sources, and more particularly to using an XML intermediate language to query over one or more data sources.

BACKGROUND OF THE INVENTION

The eXtensible Markup Language (XML) is a World Wide Web Consortium (W3C®) endorsed standard (reference the www website w3c.org/tr) for document formatting that provides a generic syntax to mark up data with human-readable tags. Although XML may easily describe the contents of a document in a well-defined format, there are other sources of data that may not so easily be described either because their structure is inconsistent with that of a standard text document or because of some other non-XML compatible characteristic. An example of such a data source may be a spreadsheet or a relational database.

The challenge of performing an XML-like search over data sources having diverse data programming models is termed virtual XML. The term is generally interpreted as including querying over virtual XML views. Virtual XML is a concept which establishes consistency across data access programming models and allows users to work with their data in the way they think about it instead of the actual storage format. The concept of querying over virtual XML data involves treating the data as if it were XML without ever really ever converting it to XML. One advantage in this concept is that the overhead of XML encoding is kept to a minimum. It is desirable if the virtual XML scenario had the advantage that it be able to utilize a query language to query over a non-XML data source as if the data source were XML query. It is also desired that the mapping between the actual data and the virtual XML representation be of high fidelity.

There are numerous challenges inherent to implementing a virtual XML. One problem is efficiency. One could simply expose a data source with a virtual XML interface, such as for example, an XML Reader, and then query over it with the existing XML query implementations such as for example, an XML Document Object Model (DOM). However, all of the work occurs in the XML query engine instead of being performed by the data source itself. The data source itself, and its associated data management system, is assumed to be more efficient in conducting a query of its data in its specifically designed language than a foreign query system having a different data model.

This aspect introduces another problem in implementing a virtual XML query; the XML data model does not always align well with the underlying data model and its type system. One could map all of the types of the underlying data source into XML types, but this process loses fidelity and is inefficient also. Furthermore, types in one system may have no obvious equivalent in another. For example, representing binary data such as images in XML requires a costly conversion to the XML character set (e.g., base64-encoding).

Prior attempts to query over virtual XML approached the problem by constructing two different data structures; one for the query and one for the mapping, and then traversing them in tandem to generate an efficient query directly over the original data sources, without ever materializing the virtual XML view. Although this approach initially works well, development becomes enormously difficult as the query and mapping languages increase in complexity. Concepts in the query or mapping often do not translate directly into the target data model, and composing complex queries with complex XML views requires an abundance of semantic analysis and rewrites.

Additionally, a system architecture which can support the transformation of queries in one language to either query representations or query results over many data sources normally requires the costly implementation of M times N paths, where M is the number of input options and N is the number of output options. Such transformation compilers can become large in number using standard architectures.

Thus there is a need for a unifying representation and a single system architecture to implement virtual XML for XML queries and views over XML and non-XML data sources. The present invention addresses the aforementioned needs and solves them with both an architecture utilizing a unifying representation and an application programming interface for users of the inventive system.

SUMMARY OF THE INVENTION

A system for compilation and execution of input queries producing query results is presented which includes an input device for receiving an input, an intermediate language compiler for generation of the semantic meaning of the input query, a target generator (or target language compiler) for transforming XML intermediate language representation into a target language forming a target query, one or more data sources, and an execution engine. The execution engine allows the input query to be executed over the data source(s). The execution engine may execute the XML intermediate language directly or first convert the XML intermediate language to a target language before executing the query. The input query may be from any XML query or view and the target language may be any query language capable of querying over a data source. The data source may be relational or non-relational type (e.g. hierarchal) data and the system is capable of querying over multiple data sources.

A method of communicating with an application, defining the functionality of an application programming language, is described. An application may send to the query system one or more calls to set one or more compile parameters and commands for converting one or more input queries to an XML intermediate language representation. An application may additionally send to the system one or more calls to convert the XML intermediate language representation to an executable query. The system may send to the application event status, progress status, intermediate results, final results, error messages, warnings and help messages, for example.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The present invention addresses the problem of querying over multiple types of data sources from multiple query sources. One solution to the problem of querying over virtual XML data sources may be to use a unifying intermediate language. The XML intermediate language of the present invention explicitly represents the meaning or semantics of a query. The XML intermediate language is termed a query intermediate language (QIL).

QIL addresses the problem known as "query/view composition". As an example, assume an XML query is to be performed over a virtual XML view of data, either XML, XML virtual, or other data. One approach may be to materialize that data source as XML, but this may very inefficient and may require more memory than is available to the system. Another approach is to virtualize the view, compose the query with that virtual view, and translate the result into operations over the original data. The user sees an XML query over a logical XML data model, but the implementation queries the native data format using whatever query system it provides. This approach is used in relational databases for structured query language (SQL) queries over SQL views, and has been used by some implementations of XML queries over XML views in the past. However, using an XML intermediate language, such as QIL, the original potentially complex view can be decomposed into smaller atomic query operations before any execution of the query. In this way, a query over a complex view becomes a query over a query plus a simpler view. Query composition turns this into just a query over the simpler view, thereby simplifying the problem. In other words the XML view itself simply becomes a query.

The XML intermediate language QIL provides (1) a uniform representation of both the XML query and the XML view, thereby greatly simplifying the query/view composition problem and (2) treating all views as "virtual XML" greatly simplifies the system's interfaces. Instead of having one API for every possible language and data model, all the APIs can share a common data model, the operators of the XML intermediate language QIL.

The XML intermediate language, QIL, also addresses a well known compiler problem. Normally, with a language, compilers need to implement M front-end languages over N back-end target machines, where M and N are integers. If each pairwise combination is implemented, M times N compiler implementations are needed to cover the required combinations. However, if the two are decoupled by introducing a common intermediate representation, then the complexity of the compiler reduces to only M plus N.

The present invention discloses both an architecture for a query runtime system using QIL and a exemplary application programming interface enabling the use of that system by one or more application programs.

Exemplary Computing Device

Figure 1:
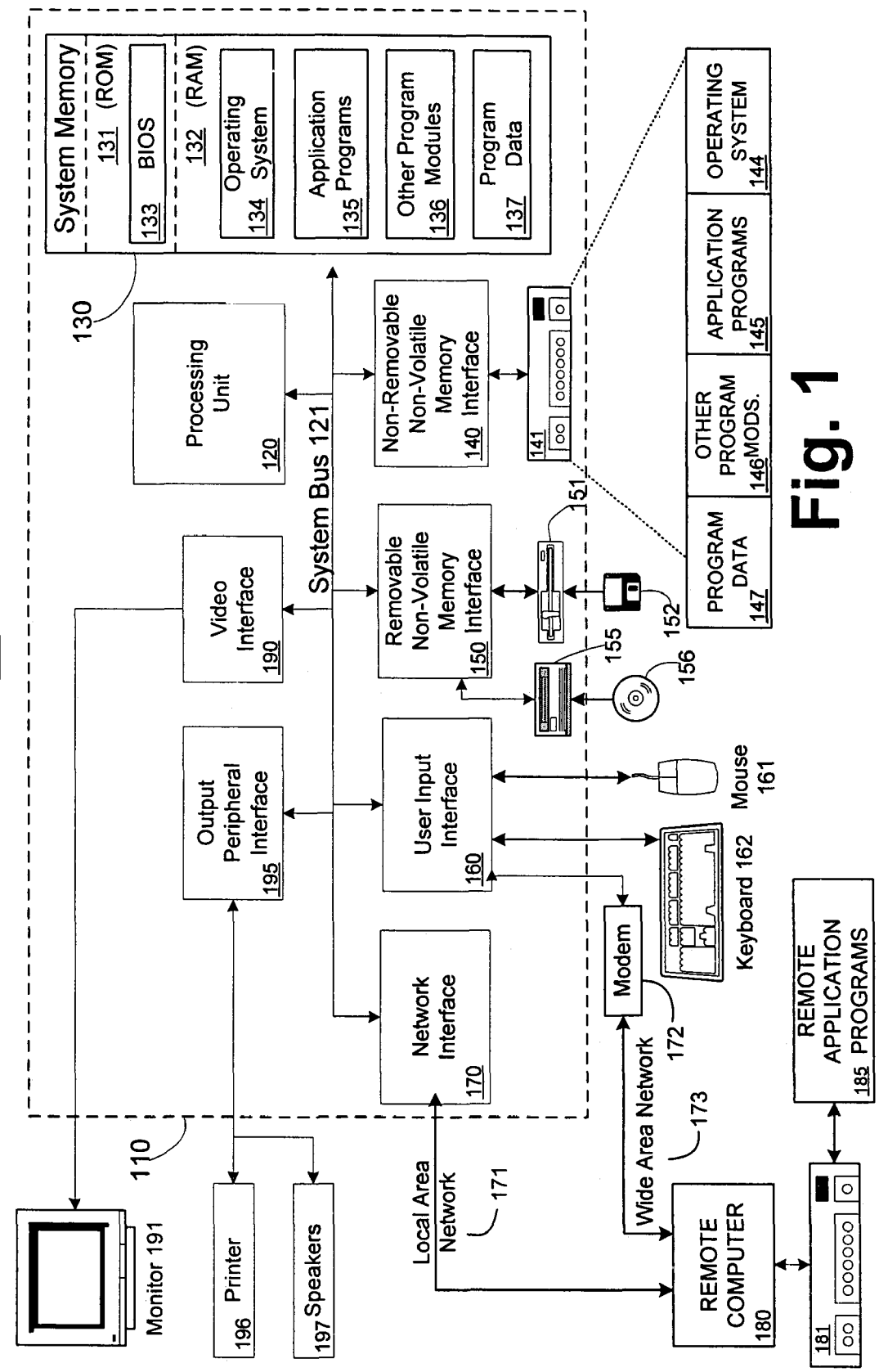
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention. Thus, while a general purpose computer is described below, this is but one example, and the present invention may be implemented with other computing devices, such as a client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus; and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and non-volatile; removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, One Microsoft Way, Redmond, Wash. 98052, includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

Exemplary Embodiments

Figure 2:
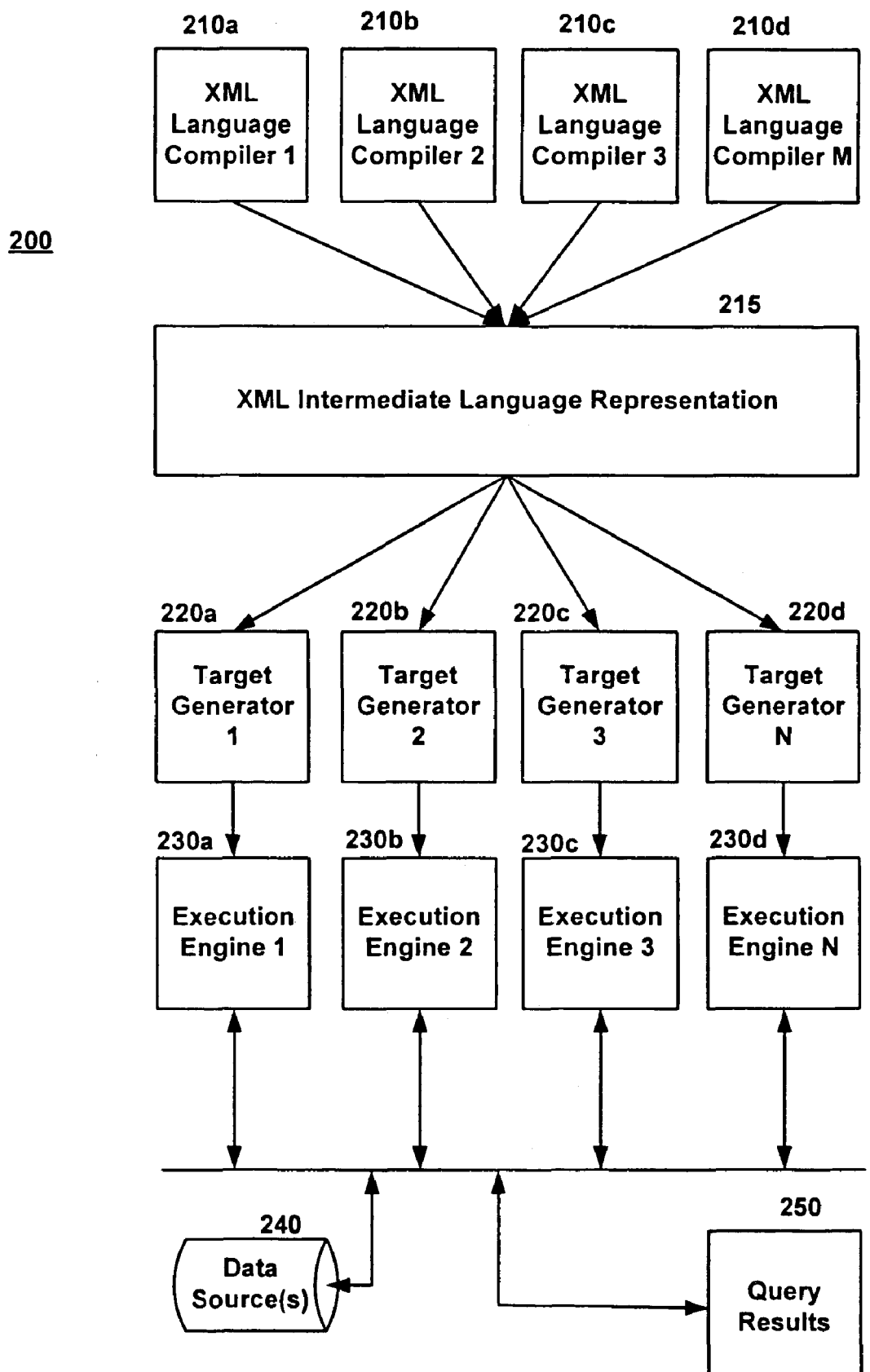
FIG. 2 depicts a block diagram architecture in which aspects of the present invention may be implemented.

FIG. 2 depicts a block diagram of an exemplary system architecture embodying aspects of the current invention. A query runtime architecture 200 including intermediate language compilers and target execution engine is shown. The architecture depicts the exemplary basic blocks implemented to receive, compile, interpret, and access data for XML queries upon multiple data sources. A plurality of front-end language compilers 210 may be realized which comport with XML or XML related standards. The original or input query may be received or input from any one of a plurality of input devices such as are shown in FIG. 1. Returning to FIG. 2, the front-end compilers 210 may receive an XML query, XML view, or other related XML language inquiries to produce a compiled XML intermediate language representation 215 of the meaning of the input query. Typical language types for the front-end compilers include the world wide web consortium (W3C®) published standards of XPath, XML Stylesheet Language (XSL), XSLT, XML Query Language (XQuery). XML view compilers may also be present and include the W3C® XML standard view of XQuery, among others. The intermediate language abstraction between query and view languages and multiple target models allows real XML data, such as from the Microsoft®.NET™ as well as virtual XML data, to be used as data sources.

There may be a plurality of back-end target generators 220 to support a multiplicity of related target query language execution engines 230. Each of the back-end target generators 220 may be constructed so that they efficiently work on data sources comporting with the model of the data within each supported data source. For example, a target query language generator for a SQL data base source may be optimized for efficiency in querying over a relational database with a SQL database management system. Thus, for example, target query language generator 220a may also be paired with an execution engine 230a to transform the intermediate language representation 215 into a target machine language compatible with a specific data source 240. Optionally, a target generator may also transform an XML intermediate language representation 215 into another intermediate language, such as for example Microsoft® intermediate language (MSIL), so that an execution engine may directly query one or more data sources 240.

Upon execution of the compiled query, the execution engine normally produces query results 250 available for further processing, storage, display to a user, or provision to a subsequent software application, for example. The target generators 220 and corresponding execution engines 230 may include such query languages as XML and SQL, to name a few.

Another aspect of the architecture is the modularity of data availability. For example, at the point where an XML intermediate language representation 215 is generated, an output may be generated so that the intermediate language representation itself is available for use in another system or available for delayed target compiling. Also, the XML intermediate language itself may be directly executed without actually converting first to a specific, non-XML intermediate language instruction query. Thus, the XML intermediate language may be used to query over one or more data sources without a compiler using an execution engine specifically adapted to execute the XML intermediate language representation. As another option in system output, the target generator output(s) may be used as an output for execution in a separate system or by another non-system application.

It should be noted that the exemplary architecture of FIG. 2 inherently allows great flexibility in constructing queries. The query architecture allows multiple queries to be input so that an intermediate language composite of the multiple queries may be generated. Additionally, multiple back-end target generators and execution engines may be used appropriately to query over data sources of differing data models. The architecture 200 also allows a reduction in the number of permutations of front-ends and back ends. FIG. 2 depicts M front end compilers and N back end compilers, where M and N are integers. Normally, this combination would yield a total number of possible system paths of M times N. However, because of the common intermediate language utilization, the number of permutations is advantageously reduced to M plus N.

The XML intermediate language generated as depicted in FIG. 2 is a representation of an XML query or view. As such, it may be termed a query intermediate language (QIL) because it is an explicit representation of the meaning of an XML query. The query intermediate language (QIL) may be viewed as a semantic representation common across all XML query and view language compilers. QIL is similar to an ordinary abstract syntax tree (AST) but different in that QIL captures not the syntax of the language but the semantics, or meaning, of a query. Another difference is that QIL is a graph structure and not a tree structure like AST.

QIL enables the abstraction of multiple different XML query languages and view definition languages (such as XPath, XSLT and XQuery) over a variety of different target data sources (such as relational and non-relational data). As such, QIL enables a common construction to support all of the compatible XML languages. Every operation is both explicit and unambiguous, which preferably completely decouples front-end compilers that assist in generating QIL from back-end engines that use QIL.

An example query intermediate language definition is provided in a co-filed patent application entitled QUERY INTERMEDIATE LANGUAGE METHOD AND SYSTEM assigned to Microsoft Corporation of Redmond, Wash. (Ser. No. 10/601,444, filed on Jun. 23, 2003). The contents of that co-filed application are considered to be incorporated in its entirety by reference into this application.

Figure 3:
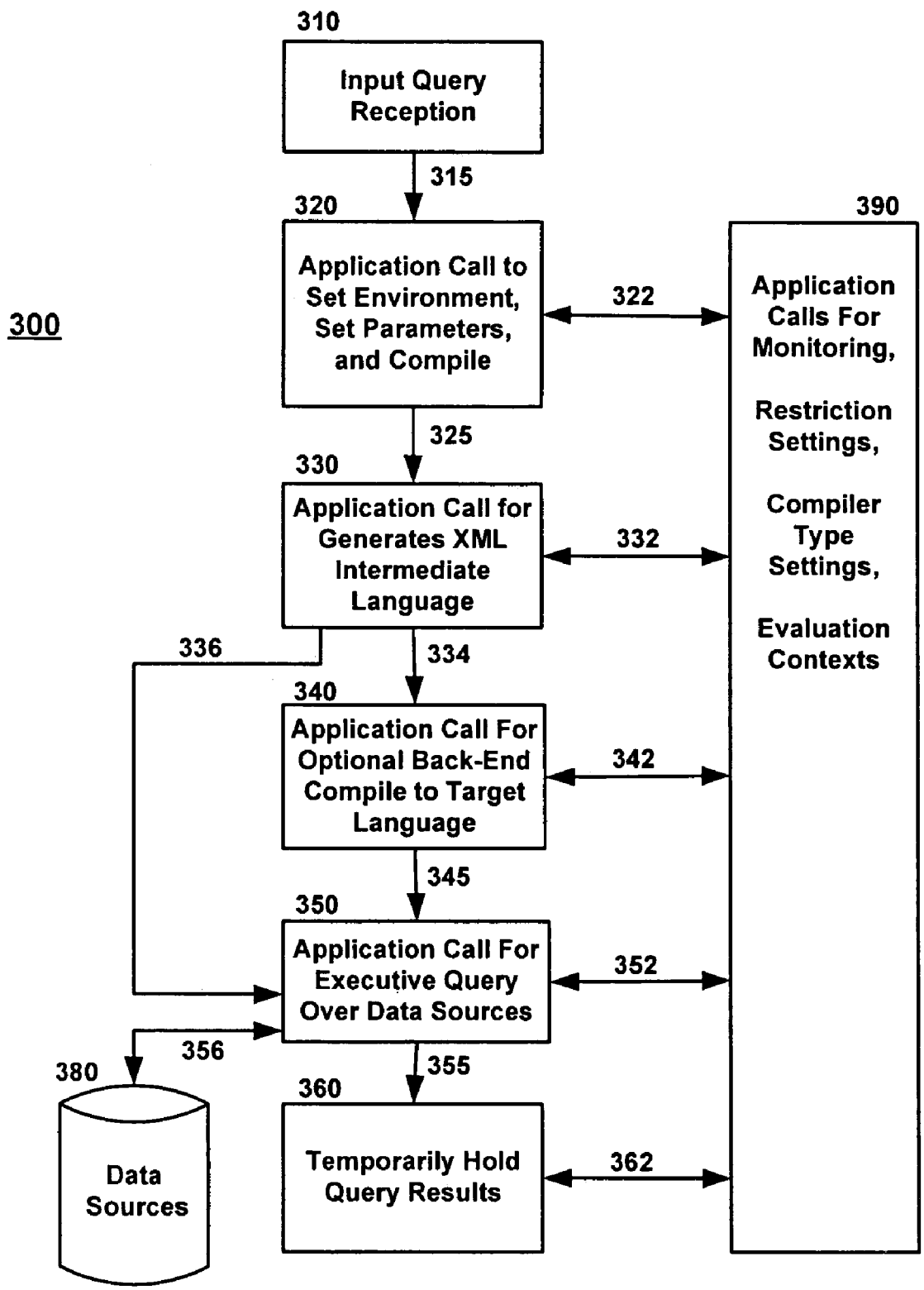
FIG. 3 illustrates a flow diagram applicable to aspects of the present invention.

FIG. 3 represents a flow diagram for an exemplary application programming interface (API) of a common query runtime architecture (e.g., the exemplary architecture described with respect to FIG. 2). An API may be viewed as residing in the system (e.g., of FIG. 2) and allows an application utilizing the system to communicate with the application. This communication allows system resources to become available to the application. Returning to FIG. 3, the process of receiving an input query, compiling the query to an XML intermediate language, converting the intermediate language representation to a target language, executing the target compilation, and generating of query results is described herein and exemplary application interfaces are highlighted.

Initially, an application may provide 315 or become aware of the reception of an input query 310. The application may interface with the query system to make one or more calls to set software environment control parameters and compile control options 320. This step allows the configuration of the one or more front-end compilers to accept the input query and prepare the software and controlled hardware for compilation of the input query. The application may monitor 322 the status and progress of parameter settings as desired by the application via status calls to a monitoring function 390.

The query system parameters are passed 325 into the query system and an application may then interface with the query system to compile an intermediate language representation 330 of the input query 310 to arrive at an XML semantic meaning of the input query. This semantic meaning may be output or monitored from the system 330 via application control for delayed processing or for use in a different system. Monitoring functions 390 allows the application to monitor the performance of the system in generating the intermediate language as well as the registration of control and configuration settings. Once the intermediate language representation is generated, it may be passed 332 to a monitoring or output function for user purposes as well as to another application is desired. Alternately, the intermediate language representation may be passed 334 to a software module for compilation by a target generator. Another alternative may be the passing 336 of the intermediate language representation to a query execution engine for direct execution.

If the intermediate language representation is passed to a target generator, an application may generate a call 340 to the query system to select a target generator, configure the compiler as appropriate, and produce a target generator output. As before, the application may monitor 342 the target generator settings and activity so as to ensure operation of both the application and query system. As previously mentioned, the query system may be stopped or suspended via application at this point because a useable product, the target-specific query, has been generated. This target-specific query may be stored for future use or may by used by another system to query over one or more data sources.

Assuming that query system operations are to continue, the target-specific query may be passed 345 to an execution engine capable of executing the query. An application may generate a call 350 to execute the target-specific query over 356 one or more data sources 380. As before, the application may monitor 352 the settings and activity of the execution engine to assure proper operation of the query system.

With the execution complete, the execution engine passes 355 the query results to an accumulator where the query system may temporarily hold the query results 360 for further processing, if desired. The query results are accessible via a call from the application 362 wherein the results may be transferred or monitored.

Exemplary Application Programming Interfaces

Examples of the API interfaces in accordance with the present invention are provided as follows:

I. Front-end Compiler Commands:

Query compilers are used to generate XmlExpressions, an encapsulation of QIL, from various XML query languages. Three compiler examples for XML query languages are provided below; XPathCompiler, XsltCompiler, and XQueryCompiler. Typical usage of the compilers involves setting of the XmlenvironmentBase and a compilation of the query.

Setting the appropriate XmlCompilerEnvironmentBase compiler environment may be used during compilation to provide information to the compilers which is extraneous to the query. For example, the XPath syntax alone does not allow for querying into other namespaces. If the XmlNamespaceResolver on the compiler environment is set to map prefixes to the appropriate namespace URIs, the XPath query can now query onto other namespaces. Note that compiler environments are not necessary for the execution for the majority of queries.

Compilation of query normally occurs after the appropriate compiler environment has been specified. At that time, the actual query may be provided by a user or other input source and compiled. The result of the compilation is an XmlExpression. Often, the query is provided with an associated Evidence object. This evidence object signifies the trustworthiness of the given query and therefore what actions it may or may not perform and hence applies a level of security to the query.

Evidence based security allows a user, via a security permission, the option to specify exactly how much of the query itself can be executed. For example, if no access whatsoever is allowed, any query which requires any sort of data access, such as for example a connection to a database, would fail. The only queries which would be able to succeed are those that return a static result (e.g., "number(3+5)") since no data is accessed from the database. If read only access is allowed, no updates would be executed. The data sources may be ensured not to be altered in any way. This maps to the capabilities of the XPath Navigator API. If append access is allowed, only INSERT statements would be executed. This ensures that the original data would not be altered in any way, allowing only additions to be made. If unrestricted access were allowed, any updates could be executed. This includes complete deletion of data within any of the data sources. This maps to the capabilities of the XPath Editor API.

A. XPath Compiler Class
1. Command: XPathCompiler(); XPathCompiler(XmlCompilerEnvironmentBase XmlCompilerEnvironment);
   Description: A method command that constructs an instance of this class. If an XmlCompilerEnvironmentBase is provided, it is set as the XmlCompilerEnvironment for the instance.
   Argument: XmlCompilerEnvironment;
   The XmlCompilerEnvironmentBase to set as the XmlCompilerEnvironment on the instance of the class.
2. Command: OnCompilationEvent;
   Description: An event which may be registered in order to receive messages during compilation. Compilers may report warnings and other messages which the user may act upon. The event does not inhibit compilation.

3. Command: XmlCompilerEnvironmentBase XmlCompilerEnvironment { get; set; }

Description: An XML Compiler Environment property. Allows a user to get or set the XmlCompilerEnvironmentBase to use. The compiler environment provides information to the query compilers which is not conveyed in the query itself.

4. Command: XmlExpression Compile(string queryText);

Description: A compile method. This function compiles the given query, an XPath query, and returns an XmlExpression which is the QIL representation of the given query. The trustworthiness of the given query is desirably set to be identical to that of the calling code.

Arguments: query;

The query to be compiled into a XmlExpression.

Returns an XML expression which is the compiled query.

B. XSLT Compiler Class—The XsltCompiler is designed to compile XSLT stylesheets into XmlExpressions.

1. Command: XsltCompiler();

XsltCompiler(XmlCompilerEnvironmentBase XmlCompilerEnvironment);

Description: A compiler method. Constructs an instance of this class. If an XmlCompilerEnvironmentBase is provided, it is set as the XmlCompilerEnvironment for the instance.

Arguments: XmlCompilerEnvironment;

The XmlCompilerEnvironmentBase to set as the XmlCompilerEnvironment on the instance of the class.

2. Command: OnCompilationEvent;

Description: An event which may be registered in order to receive messages during compilation. Compilers may report warnings and other messages which the user may act upon. The event does not inhibit compilation.

3. Command: XmlCompilerEnvironmentBase XmlCompilerEnvironment { get; set; }

Description: A property which allows a user to get or set the XmlCompilerEnvironmentBase to use. The compiler environment provides information to the query compilers in addition to the actual query being compiled. A default instance of XmlCompilerEnvironment.

4. Command: XmlExpression Compile(string queryUri, XmlResolver resolver); XmlExpression Compile(string queryUri, XmlResolver resolver, Evidence evidence);

Description: A compile method. The queryUri is resolved via the XmlResolver parameter and compiled as an XSLT stylesheet. The XmlResolver parameter is also used to resolve any xsl:include and xsl:import statements which are used to compile the original stylesheet. The evidence passed in is used to determine the trustworthiness of the given query and subsequently what actions it can execute. If the overload with no evidence is used, the URI given is used to generate the appropriate evidence for the query. Returns an XMLExpression which is the compiled query.

Arguments: queryUri;

The URI to resolve to retrieve the XSLT stylesheet to compile.

resolver;

The XmlResolver is used to resolve the XSLT stylesheet and any xsl:import and xsl:include statements in the stylesheet.

evidence;

Security evidence which determines the trustworthiness of the given query.

5. Command: XmlExpression Compile(XmlReader queryText, XmlResolver resolver); XmlExpression Compile(XmlReader queryText, XmlResolver resolver, Evidence evidence);

Description: A compile method. This function returns the XmlExpression which represents the XSLT query which was passed in via the XmlReader. The Evidence passed in is used to determine the trustworthiness of the given query and subsequently what actions it can execute. If the overload which takes no evidence is used, the compiler will attempt to attain the appropriate evidence via the IDataEvidence interface. If this interface is not implemented, the appropriate exception. Returns an XmlExpression which is the compiled query.

Arguments: query;

An XmlReader which contains the XSLT which is to be compiled into an XmlExpression.

resolver:

The XmlResolver is used to resolve xsl:import and xsl:include statements in the given XSLT.

evidence;

Security evidence which determines the trustworthiness of the given query.

C. XQuery Compiler Class

1. Command: XQueryCompiler();

XQueryCompiler(XmlCompilerEnvironmentBase XmlCompilerEnvironment);

Description: A compiler method. Constructs an instance of this class. If an XmlCompilerEnvironmentBase is provided, it is set as the XmlCompilerEnvironment for the instance.

Arguments: XmlCompilerEnvironment;

The XmlCompilerEnvironmentBase to set as the XmlCompilerEnvironment on the instance of the class.

2. Command: OnComilationEvent;

Description: An event which may be registered in order to receive messages during compilation. Compilers may report warnings and other messages which the user may act upon. The event does not inhibit compilation.

3. Command: XmlCompilerEnvironmentBase XmlCompilerEnvironment { get; set; }

Description: An XML compiler environment property. Allows a user to get or set the XmlCompilerEnvironmentBase to use. The compiler environment provides information to the query compilers in addition to the actual query being compiled. This is a default instance of XmlCompilerEnvironment.

4. Command: XmlExpression Compile(TextReader queryText);

Description: A compile method. This function returns the XmlExpression which represents the XQuery query which was passed in. The evidence passed in is used to determine what the query should be allowed to execute.

Arguments: query;
  The query to be compiled into a XmlExpression.
  evidence;
  Security evidence which determines the trustworthiness of the given query.
5. Command: XmlExpression Compile(string queryText);
  Description: This function compiles and returns an XmlExpression for the given query. The evidence provided shows the trustworthiness of the given query.
  Arguments: query;
  A string which contains the query to be compiled into a XmlExpression.
  evidence;
  Security evidence which determines the trustworthiness of the given query.
6. Command: XmlExpression Compile(string queryUri, XmlResolver resolver);
  Description: The queryUri is resolved via the XmlResolver parameter and compiled as an XQuery. Returns an XmlExpression which is the compiled query.
  Arguments: queryURI;
  The URI to resolve to retrieve the XQuery to compile.
  resolver;
  The XmlResolver used to resolve the XQuery to compile.

II. Compiler Environment Commands

In general, compiler environments are used to provide additional information to the query compilers to help them compile the actual query. Specifically, this interface is used to resolve external functions, variables, and the default document which may be desired to compile a query. It is important to note that all resolutions should return an XmlExpression.

An example of a function resolution is the XmlViewSchema and the map:view() function. No query languages have the concept of mapping built in and therefore require extensions which allow this to occur. The XmlViewSchema has the ability to resolve the map:view() function to an XmlExpression and therefore can be used by the individual compilers. A variable resolution may operate in much the same way. The compiler may read across a variable which is not declared in the query syntax. This is another area where XPath requires the compiler environment. In a context document resolution every XML query language has to query over a default or context document.

The XmlCompilerEnvironmentBase is an abstract class which is a full compiler environment. This class only has the ability to resolve the various items that a given compiler needs which allows implementations to perform dynamic operations. The XmlCompilerEnvironmentBase is the environment the query compilers utilize. It may provide resolution of the majority of options that any given compiler may need. It may implement all the methods on IXmlCompilerInclude and IXmlNamespace. In addition to implementing IXmlCompilerInclude, the XmlCompilerEnvironmentBase also enables resolution of other items such as schemas, namespaces, and the manner in which the query should be compiled.

XQuery has the ability to utilize W3C® Xml Schema (Xml Schema Definition—XSD) during compilation of a query to perform static type analysis. The compiler environment provides resolution of these schemas. The namespace/prefix resolution may be utilized so that users can reuse commonly used prefix-namespace bindings between compilations without the need to specify in the query itself each time. This functionality may be provided by implementing the IXmlNamespaceResolver. Build type API instructions may be provided to enable users to find problems much more efficiently.

In addition to providing resolution for XmlEnvironmentBase, a method of adding these resolved items to the environment is provided. The XmlCompilerEnvironment can add functions via at least three different methods for use in compilers. The XmlCompilerEnvironment can take implementations of IXmlCompilerInclude and use them for resolution of a given function. Essentially the "ResolveFunction" method call would be passed onto the added implementations so they may attempt to resolve it. The compiler environment can also add precompiled query libraries, in the form of an XmlExpression. Query libraries may be defined as a group of user defined XQuery functions which are compiled into a single XmlExpression. In this manner, any query language can utilize the power of XQuery by calling out to an external function. Parameters may be mapped appropriately to the query library for the given function. The compiler environment can also add XmlExpressions which are not query libraries. Individual compiled queries (such as an XPath or an XSLT) may be added as a query function.

The XmlCompilerEnvironment can also add variables using a variety of methods. The XmlCompilerEnvironment can take implementations of IXmlCompilerInclude and use them for resolution of a given variable. Essentially the "ResolveVariable" method call may be passed onto the added implementations so they may attempt to resolve it. The compiler environment also allows for existing XmlExpressions to be utilized as variables. This is similar to adding an XmlExpression as a function. This provides users the ability to utilize features of a specific language in a different language. Adding a generic object as a variable allows users to bind to the values of the objects within their queries. The objects are converted into the appropriate XSD type and value for use in the query.

The XmlCompilerEnvironment can set the context document which will be used by the query compilers. There are at least three methods of setting the appropriate context document onto the XmlCompilerEnvironment. An object which implements IXmlCompilerInclude may be used to set the context document of the query. The XmlCompilerEnvironment may simply pipe the ResolveContextDocument() method call to the IXmlCompilerInclude for resolution of the document. An example of this is the XmlViewSchema. This enables users to utilize mapping without using the map:view() function. An XmlExpression may also be set as the context document. In this manner, a user could create a virtual XML view via a query much as they do with mapping support. It may be easier for users to expose simplistic mappings and have addition logic in a separate query than to have both coupled tightly. Languages such as XSLT and XQuery have the ability to query over both a context and named documents simultaneously. By setting the context document resolution to a URI, one may redirect the context document to be dynamically resolved rather than implicitly provided. This eases programming as users may specify a single XmlResolver to query over rather than a context document and an XmlResolver combination.

It should be noted that the order in which variables or functions are added to the XmlCompilerEnvironment may affect the order in which resolution successfully occurs. One processing rule supports that explicitly named functions/ variables are checked for successful matches. Duplicate named function/variables may not be added successfully. Note that query libraries which are contained in a single XmlExpression fall into this category. Another processing rule supports that IXmlCompilerIncludes are sequentially tested for matches according to the order they were added. An IXmlCompilerInclude can contain duplicate functions/variables as other items. If it contains a duplicate of an explicitly named function/variable, it may never be resolved since the explicitly named function/variable will be resolved first. If another IXmlCompilerInclude contains a duplicate function/variable, only the first added IXmlCompilerInclude will resolve the given item.

For example, if an XmlCompilerEnvironment is generated and adds two IXmlCompilerIncludes for function resolution, then when attempting to resolve actual functions, the first IXmlCompilerInclude may be checked. If the resolution fails, the second IXmlCompilerInclude is checked for successful resolution. If a named function is added with an XmlExpression to the environment, it would be checked before the IxmlCompilerInclude implementations because explicitly named functions/variables may be checked before implementations of IXmlCompilerInclude.

Exemplary compiler environment commands are given below:
1. Command: XmlExpression ResolveFunction(XmlQualifiedName functionName, XmlExpression[ ] functionparameters);
    Description: A resolve function method. This method allows compilers to resolve external functions during compilation. The name and the arguments which are passed in are used for an implementation's resolution. If resolution fails, this function returns null. Returns an XmlExpression which represents the results of the function. If resolution was unsuccessful, null is returned.
    Arguments: functionName;
        The fully qualified name of the function that is being looked up. functionParameters;
        An array of XmlExpressions which represent the parameters the function is being called with. Implementations of XML compiler environments will utilize this information during resolution for confirming types of parameters and optimizations.
2. Command: XmlExpression ResolveVariable(XmlQualifiedName variableName);
    Description: This method allows compilers to resolve external variables during compilation. The fully qualified name of the variable is used for resolution. If resolution fails, this function returns null. Returns an XmlExpression which represents the value of the variable. If resolution was unsuccessful, null is returned.
    Argument: variableName;
        The fully qualified name of the variable that is being looked up.
3. Command: XmlExpression ResolveContextDocument ();
    Description: This method allows compilers to dynamically resolve how the context document is retrieved. If resolution fails, this method returns null. Returns an XmlExpression which represents how the context document is resolved. If resolution fails, null is returned.
4. Command: XmlSchema ResolveSchema(string namespace);
    Description: Allows compilers to retrieve a schema for a given namespace. This method returns null if the schema cannot be resolved. Returns an XmlSchema object which is the compiled schema for the given namespace. If the schema cannot be resolved, null is returned.
    Arguments: namespace;
        The namespace for which to resolve a schema.
5. Command: bool IsDebug { get; };
    Description: A property which allows compilers to determine if they should compile a query with debug characteristics or not.
6. Command: XmlCompilerEnvironment(); XmlCompilerEnvironment(bool IsDebug);
    Description: A method which instantiates a new XmlCompilerEnvironment. If the overload which provides a value for IsDebug is provided, this value will be return on the IsDebug accessor called on the base XmlCompilerEnvironment class. If the default constructor is used, the value will default to false.
7. Command: XmlNamespaceManager XmlNamespaceManager { get; set; }
    Description: The XmlNamespaceManager property is used for resolution by the XmlCompilerEnvironmentBase.ResolvePrefix and XmlCompilerEnvironmentBase.ResolveNamespace methods.
8. Command: XmlSchemaSet XmlSchemaSet { get; set; }
    Description: This XmlSchemaSet property is used for resolution by the XmlCompilerEnvironmentBase.ResolveSchema method to set and get Xml Schema type information.
9. Command: void SetContextDocumentResolution (IXmlCompilerInclude documentResolver);
    Description: This context document method allows a user to set the resolution of the context document to come from an implementation of IXmlCompilerInclude.
    Argument: documentResolver;
        An implementation of IXmlCompilerInclude which can resolve the context document.
10. Command: void SetContextDocumentResolution (XmlExpression documentExpression);
    Description: This document context method allows a user to set a default document as an XmlExpression. This would be useful in composition of XSLT or XPath over another query or mapping.
    Argument: documentExpression;
        The XmlExpression which will be composed in place of the default document resolution in the query which is compiled using the current environment.
11. Command: void SetContextDocumentResolution (string contextDocumentUri);
    Description: This document context method allows a user to set the default document name which will be used during resolution of the document during runtime. This is useful for XPaths and XSLT where there is only a default document or a combination of default and named documents.
    Arguments: contextDocumentUri;
        The name which will be resolved at runtime via the provided XmlResolver.
12. Command: void AddFunctions(IXmlCompilerInclude functionResolver);
    Description: This function method adds the IXmlCompilerInclude to the compiler environment which enables the IXmlCompilerInclude to be used to resolve functions during compilation.

Arguments: function resolver;

An implementation of IXmlCompilerInclude which is capable of function resolution.

13. Command: void AddFunctions(XmlExpression library);

Description: This function method is used to add an existing XmlExpression as a function library. Example: A user has a multiplicity of XQuery functions which then compile into an XmlExpression. The user then adds this XmlExpression as a function library and associates it with a given namespace. The may then reuse these functions inside other queries (not restricted to XQueries).

Arguments: library;

A compiled XmlExpression which contains previously compiled functions.

14. Command: void AddFunction(XmlQualifiedName name, XmlExpression function);

Description: This function method allows a user to bind an XmlExpression as a function for use in compilation of other queries. Examples: For XQuery, an entire XQuery will be considered a single function. For XSLT, an entire stlesheet will be considered a single function. For XPath, an entire XPath expression will be considered a single function.

Arguments: name;

A fully qualified name under which the function is referenced in the query.

Function;

The XML expression which is bound.

15. Command: void AddVariables(IXmlCompilerInclude variableResolver);

Description: This method of resolving variables adds the IXmlCompilerInclude to the compiler environment which enables the IXmlCompilerInclude to be used to resolve variables during compilation.

Argument: variableResolver;

An implementation of IXmlCompilerInclude which is capable of providing variable resolution.

16. Command: void AddVariable(XmlQualifiedName name, XmlExpression variable);

Description: This method of adding variables binds an external parameter to a particular definition. A valid function for XQuery is one which is not contained inside an XQuery function. An entire XSLT stylesheet will be considered a variable. An entire XPath expression will be considered a variable.

Arguments: name;

The name of the external parameter to be bound.

variable;

The XMlExpression which defines the variable.

17. Command: void AddVariable(XmlQualifiedName name, object variable);

Description: A method of adding a variable that binds a common language runtime object to a variable. The object is converted into the XSD equivalent and its value is used.

Arguments: Name;

The name of the external parameter to be bound.

Variable:

The common language runtime object which defines the variable.

18. Command: void AddVariableDeclaration(XmlQualifiedName name, XmlSchemaType type, XmlExpression defaultValue);

Description: A method of adding a variable declaration which declares a variable without defining it yet. Definition will be provided at execute time via the XmlArgumentList. If the appropriate variable is not found in the XmlArgumentList, the defaultValue which has been provided will be used instead.

Argument; name;

The fully qualified name of the variable to declare.

type;

The XmlSchemaType of the declared variable.

defaultValue;

The default value of the variable.

III. XML Expression Commands

The XmlExpression is the compiled form of the given XML query. This is essentially an encapsulation of QIL. The XmlExpression is a composable object. That is, once an XmlExpression has been created, it can be reused during compilation of a different query to enable additional functionality such as query libraries or virtual views.

There are at least two methods available on XmlExpression; a value returns an IXmlValueReader which can be used to retrieve the value of the given, XmlExpression if it is a static value and a type returns an XmlSchemaType object which can be used to retrieve the XSD type of the XmlExpression.

1. Command: IXmlValueReader Value{ get; }

Description: Returns an IXmlValueReader which is the value of the XmlExpression. Also returns an object which implements IXmlValueReader if the value is a constant.

2. Command: XmlSchemaType Type{ get; }

Description: This property permits the return of an XmlSchemaType which represents the type of the XmlExpression as represented by the XML Schema (XSD). Also returns an XmlSchemaType if the value is a constant.

IV. Back-end Target Query Generator Commands

Target query generators (or target language compilers) are used to generate objects which are capable of executing a given query over specific data sources. Two exemplary forms are described here. The XmlILGenerator engine is capable of executing queries over RXPathNavigator or XPathEditor implementations. This allows any data source, such as the XmlCache, which is capable of exposing an RXPathNavigator, to have query abilities 'built-in'. The SQLGenerator engine may be capable of processing the XmlExpressions directly and thus able to optimize SQL statements for execution.

A. XML Target Commands

1. Command: XmlILGenerator();

Description: This method command constructs a new XmlILGenerator.

2. Command: XmlCommand Generate(XmlExpression query);

Description: This method command generates an XmlCommand for the given XmlExpression. The XmlCommand can then be executed to retrieve the results of the query. Returns an XmlCommand which is an executable form of the query.

Argument: query;

The XmlExpression from which the XmlCommand is generated.

3. Command: OnGenerateEvent;

Description: An event which may be registered in order to receive messages during generation. Generators may report warnings or other messages which the user may act upon. This event does not inhibit XMLCommand generation.

B. SQL Target Commands

1. Command: SqlGenerator();

Description: This generator takes QIL and is capable of querying against a database. This method constructs a new SqlGenerator.

2. Command: XmlCommand Generate(XmlExpression query);

Description: This method command generates an XmlCommand for the given XmlExpression. The XmlCommand can then be executed to retrieve the results of the query. Returns an XmlCommand which is an executable form of the query.

Arguments: Query;

The XmlExpression from which the XmlCommand is generated.

3. Command: OnGenerateEvent;

Description: An event which may be registered in order to receive messages during generation. Generators may report warnings or other messages which the user may act upon. This event does not inhibit XMLCommand generation.

V. XML Command

The XmlCommand may be one of the resultant output objects in the query system runtime. It is the physical query plan which can be executed by the user or other program. The XmlCommand is supplied with resolution of the data sources and runtime parameters which may be used to execute the query.

1. Command: OnExecutionEvent;

Description: This event command may be used during execution of the query to report information back to the user which is not part of the result set. For example, several W3C® query standards allow implementation dependent behavior during processing. The execution runtime may report this behavior to the user.

2. Command: void Execute(RXPathNavigator contextDocument, XmlArgumentList argList, XmlWriter results);

void Execute(RXPathNavigator contextDocument, XmlResolver dataSources, XmlArgumentList argList, XmlWriter results);

Description: This execute method executes the query over the provided RXPathNavigator with the given XmlArgumentList as run-time parameters. The results are output to the provided XmlWriter.

Arguments: contextDocument;

The default document to query over.

argumentList;

The XmlArgumentList will contain any run-time parameters which may be used to execute the query.

results;

The XmlWriter the results of this query are written into.

3. Command: void Execute(XPathEditor contextDocument, AmlArgumentList argList, XmlWriter results);

Description: This execute method executes the query over the provided IXmlInforsetEditor as run-time parameters. The results are output to the provided XmlWriter. This overload allows updates to be executed as it utilizes an XPathEditor rather than an RXPathNavigator.

Arguments: defaultDocument;

The default document to query over.

argumentList;

The XmlArgumentList will contain any run-time parameters which may be used to execute the query.

results;

the XmlWriter the results of this query are written into.

4. Command: void Execute(XmlResolver dataSources, XmlArgumentList argList, XmlWriter results);

Description: This execute method executes the query by accessing datasources via the XmlResolver and using run-time parameters as provided by the XmlArgumentList. The results are output to the provided XmlWriter.

Arguments: dataSources;

An XmlResolver which is used to retrieve named datasources which may be used to execute a query.

argumentlist;

The XmlArgumentList will contain any run-time parameters which may be necessary to execute the query.

results;

The XmlWriter the results of this query are written into.

5. Command: void Execute(string contextDocumentUri, XmlResolver dataSources, XmlArgumentList argList, XmlWriter results);

void Execute(string contextDocumentUri, XmlResolver dataSources, XmlArgumentList argList, TextWriter results);

void Execute(string contextDocumentUri, XmlResolver dataSources, XmlArgumentList argList, Stream results);

Description: This execute method executes the query by accessing datasources via the XmlResolver and using run-time parameters as provided by the XmlArgumentList. The default document is mapped into the XmlResolver with the provided name. The results are output to the provided XmlWriter.

Arguments: contextDocumentUri;

The URI of the context document which will be resolved via the XmlResolver parameter.

dataSources;

An XmlResolver which is used to retrieve the context and named datasources which may be used to execute a query;

argumentList;

The XmlArgumentList will contain any run-time parameters which may be necessary to execute the query.

Results;

The XmlWriter, TextWriter, or Stream the results of this query are written into.

6. Command: XmlReader Execute(RXPathNavigator defaultDocument, XmlArgumentList argList;

Description: This method executes the query over the provided RXPathNavigator with the given XmlArgumentList as run-time parameters. The results are returned by an RXmlReader. Returns an XmlReader which returns the results of the query.

Arguments: defaultDocument;

The default document name which is resolved by the resolver.

argumentList;

The XmlArgumentList will contain any run-time parameters which may be used to execute the query.

7. Command: XmlReader Execute(XPathEditor default-Document, XmlArgumentList argList;
    Description: This method executes the query over the provided XPathEditor with the given XmlArgumentList as run-time parameters. The results are returned by an RXmlReader. This overload allows updates to be executed as it takes an XPathEditor vs. an XmlReader. Returns an XmlReader which returns the results of the query.
    Arguments: defaultDocument;
        The default document name which is resolved by the resolver.
    argumentlist;
        The XmlArgumentList will contain any run-time parameters which may be used to execute the query.
8. Command: XmlReader Execute(XmlResolver dataSources, XmlArgumentList, argList;
    Description: This method executes the query by accessing dataSources via the XmlResolver and using run-time parameters as provided by XmlArgumentList. The results are returned by an RXmlReader.
    Arguments: dataSources;
        An XmlResolver which is used to retrieve named datasources which may be used to execute a query.
    argumentList;
        The XmlArgumentList will contain any run-time parameters which may be necessary to execute the query.
9. Command: XmlReader Execute(string contextDocumentUri, XmlResolver, dataSources, XmlArgumentList argList;
    Description: This method executes the query by accessing dataSources via the XmlResolver and using run-time parameters as provided by XmlArgumentList. The default document may be mapped into the XmlResolver with the provided name. The results are returned by an XmlReader.
    Arguments: contextDocument Uri;
        The context document's URI which is resolved by the resolver.
    dataSources;
        An XmlResolver which is used to retrieve named datasources which may be used to execute a query.
    argumentList;
        The XmlArgumentList will contain any run-time parameters which may be necessary to execute the query.
10. Command: void Execute(XmlResolver, inputSrc, XmlArgumentList argList XmlResolver, outputSrc;
    Description: This method executes the query with the given XmlArgumentList as run-time parameters and XmlResolver as the desired input sources. The results are output.
    Arguments: argList;
        The XmlArgumentList will contain any run-time parameters which may be used to execute the query.
    inputSrc;
        An XmlResolver which returns datasources for the desired inputs.
    outputSrc;
        An XmlResolver which returns datasources for the desired outputs.

VI. Query Event Messages
    1. Command: string Message { get; };
        Description: A message from the execution runtime which may convey out of band information to the user.

As mentioned above, while exemplary embodiments of the present invention have been described in connection with various computing devices and network architectures, the underlying concepts may be applied to any computing device or system in which it is desirable to implement a query system and an application programming interface. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A computer-implemented method of communicating with an application using an application programming interface (API), the method executing in a computer system having M front-end languages and N back-end compilers, where M and N are integers, the API method comprising:
   the system receiving from the application, one or more calls to set one or more compile parameters and commands for converting a plurality of input queries in a plurality of language compilers to an XML intermediate language representation, wherein the XML intermediate language representation is a composite of the plurality of input queries, is an explicit representation of the meaning of the plurality of input queries, and has a graph structure; and
   the system receiving from the application, one or more calls to convert the XML intermediate language representation to at least one query, the at least one query, when executed, instructing the system to query over a plurality of data sources having differing data models;
   wherein the one or more calls to convert the XML intermediate language to at least one query comprises a plurality of API calls comprising commands to a plurality of target generators and corresponding execution engines having different data languages, wherein the plurality of API calls share a common data model comprising operators of the graph structure of the XML intermediate data language representation, and wherein use of the M front-end languages and the N back-end compilers results in only M plus N system paths instead of M times N system paths.

2. The method of claim 1, further comprising the application receiving from the system one or more of the group consisting of event status, progress status, intermediate results, final results, error messages, warnings and help messages.

3. The method of claim 1, wherein the one or more calls to set one or more environment, compile parameters and compile commands comprise one or more of enabling message reception from the system, specifying query permission and execution restrictions, selecting the input query and compiler type, and establishing evaluation contexts.

4. The method of claim 3, wherein the compiler type comprises XPath, XSLT and XQuery language compilers.

5. The method of claim 1, wherein the XML intermediate language representation is a semantic representation of an input query.

6. The method of claim 1, wherein converting the XML intermediate language to the executable query comprises preparing the XML intermediate language for direct execution in a target query execution engine, wherein direct execution avoids the use of a compiler for the target execution engine.

7. The method of claim 1, wherein converting the XML intermediate language to the executable query comprises converting the XML intermediate language into a target representation using a target generator.

8. The method of claim 7, wherein the target representation is one or more of the group consisting of an XML language target, a SQL language target and an intermediate language target.

9. A system for compilation and execution of input queries producing query results, comprising:
   a plurality of input devices for receiving a plurality of input queries;
   a quantity of M front-end query language to intermediate language compilers wherein a composite XML intermediate language representation is compiled from the plurality of input queries, wherein the XML intermediate language representation is an explicit representation of the meaning of the plurality of input queries and has a graph structure;
   a quantity of N back-end target generators wherein the XML intermediate language representation is transformed into a plurality of target queries;
   a plurality of data sources for querying over; and
   a plurality of execution engines wherein the plurality of target queries are executed over the plurality of data sources to produce the query results; and
   wherein use of the M front-end query language to intermediate language compilers and the N back-end target generators results in only M plus N system paths instead of M times N system paths.

10. The system of claim 9, wherein the plurality of input queries comprise queries formed from one or more of XPath, XSLT, and XQuery languages.

11. The system of claim 9, wherein the XML intermediate language representation expresses the meaning of the input query.

12. The system of claim 9, wherein the plurality of target generators comprise one or more of an XML language generator, a SQL language generator and an intermediate language generator.

13. The system of claim 9, wherein the plurality of data sources comprise one or more of relational data sources and non-relational data sources.

14. The system of claim 13, wherein non-relational data sources comprise spreadsheets and word processing documents.

* * * * *